F. H. DECKER & L. J. STILLING.
VACUUM BOTTLE.
APPLICATION FILED FEB. 20, 1911.
1,044,757.
Patented Nov. 19, 1912.
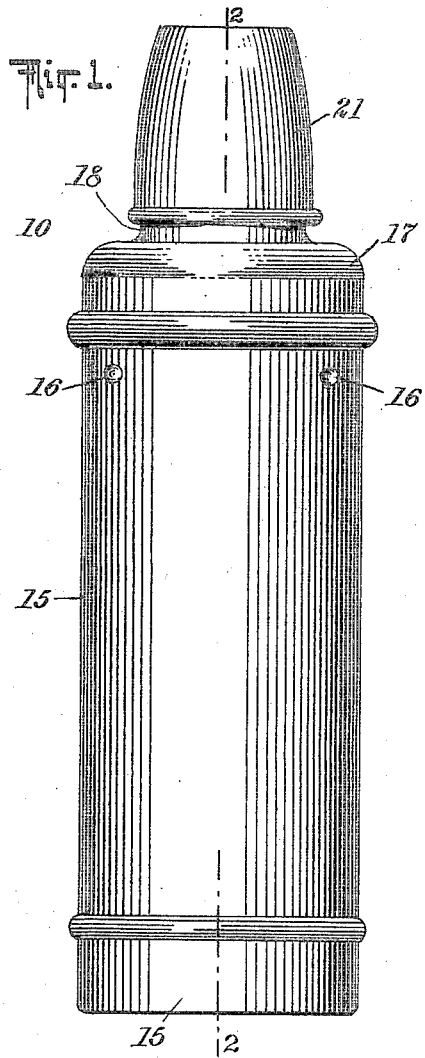
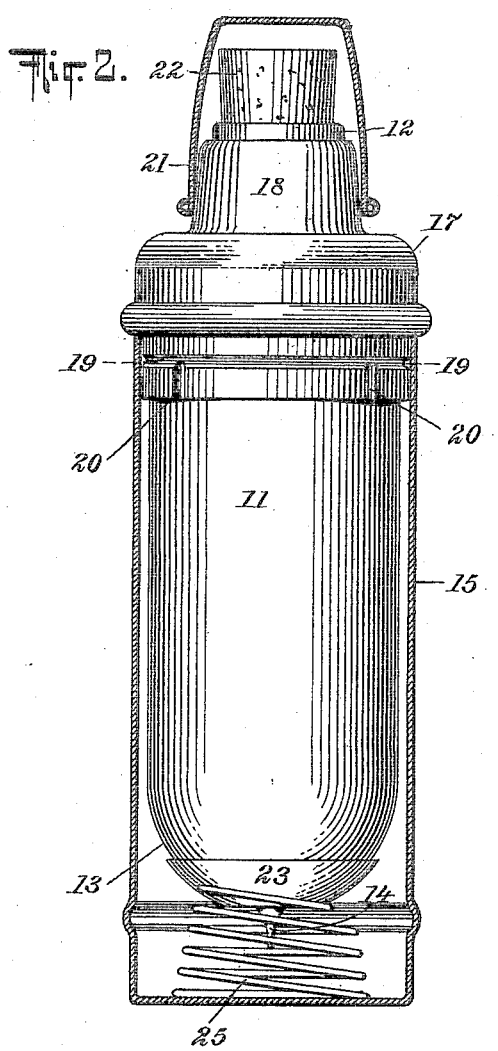
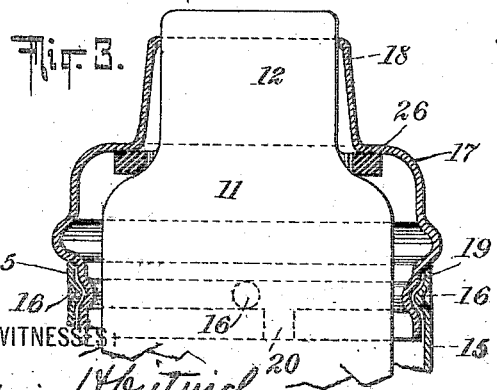
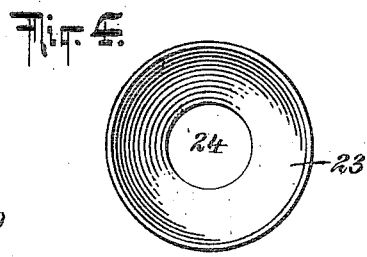
WITNESSES
INVENTORS
FRED H. DECKER
LOUIS J. STILLING
BY
their ATTORNEY

UNITED STATES PATENT OFFICE.

FRED H. DECKER, OF BRISTOL, PENNSYLVANIA, AND LOUIS J. STILLING, OF NEWARK, NEW JERSEY.

VACUUM-BOTTLE.

1,044,757.

Specification of Letters Patent.

Patented Nov. 19, 1912.

Application filed February 20, 1911. Serial No. 609,574.

*To all whom it may concern:*

Be it known that we, FRED H. DECKER, a citizen of the United States, residing at Bristol, Bucks county, in the State of Pennsylvania, and LOUIS J. STILLING, a citizen of the United States, residing at Newark, Essex county, in the State of New Jersey, have invented certain new and useful Improvements in Vacuum-Bottles, of which the following is a full, clear, and exact specification.

Our invention relates to improvements in means for storing foods, liquids and other fluids, and the same has for its object more particularly to provide a simple, efficient and reliable portable receptacle by means of which the contents of the receptacle may be maintained without material change of temperature for considerable periods of time.

Further, said invention has for its object to provide a receptacle closed at its bottom and adapted to receive an inner receptacle, and removably and yieldingly support the same in position therein.

Further, said invention has for its object to provide a receptacle of the character specified having a removable top, and means for securing the same in position therein in order to maintain the inner vessel or receptacle yieldingly in place therein.

Further, said invention has for its object to provide a receptacle of the character specified, which is so constructed that when the top is removed therefrom, the inner receptacle will not be suddenly projected out of its casing.

To the attainment of the aforesaid objects and ends, our invention consists in the novel details of construction, and in the combination, connection and arrangement of parts hereinafter more fully described and then pointed out in the claim.

In the accompanying drawings, forming part of the specification, wherein like numerals of reference indicate like parts, Figure 1 is a side view showing one form of vacuum bottle constructed according to, and embodying our said invention; Fig. 2 is a central section taken on the line 2—2 of Fig. 1; Fig. 3 is an enlarged detail central section of the upper portion of the vacuum bottles, and the casing and top for securing the same in position within the outer receptacle, and Fig. 4 is a detail plan or top view showing the spring supported cap for engaging the bottom of the inner receptacle.

In said drawings, 10 designates a vacuum bottle or receptacle as a whole, comprising an inner double-walled receptacle or bottle 11, of usual general construction, having a tapering neck 12, and a rounded bottom 13 provided upon its under side with a centrally located depending teat or projection 14.

15 denotes a substantially cylindrical outer inclosing casing whose interior diameter and length are greater than the exterior diameter and length of the inner receptacle or bottle 11. The said inclosing casing 15 is closed at its bottom and open at its top, and provided adjacent to its upper edge with a plurality of inwardly extending projections 16, 16.

17 denotes a top having a tapering neck 18 provided with an opening adapted to receive the neck 12 of the inner receptacle 11. The top 17 is provided adjacent to its lower edge with an annular groove or recess 19, with which communicate a series of equally spaced vertical grooves 20, 20 having their lower ends terminating at the lower edge of the cap 17, and their upper ends merging with the annular groove or recess 19. The annular groove 19, and the vertical grooves 20, 20 are of such size, and so arranged, that the same will readily engage with any of the inwardly extending projections 16, 16 adjacent to the upper edge of the casing 15 when said top is inserted within the open upper end of the casing 15.

21 denotes a cap removably disposed upon the neck 18 of the top 17 which serves to inclose the neck 12 of the inner receptacle, and the seal or cork 22 therein.

23 denotes a cup which is conformed to the rounded lower end of the inner vessel or receptacle 11, and provided with a central opening adapted to receive the teat or projection 14 extending from the bottom of the receptacle 11, and 25 denotes a coil spring having its upper end soldered or otherwise secured to the under side of the cup 23, and its lower end free and adapted to rest upon the bottom of the receptacle 15, when the vessel 11 is inserted within the outer receptacle 15, and secured in position therein by means of the removable top 18.

In order to maintain the upper end of the inner receptacle 11 at about the junction of the body with the neck portion 12 free from the top 17, a yielding packing 26 of rubber or other suitable material in the form of a ring is disposed upon the upper end of said inner receptacle 11, and surrounds the neck portion 12 thereof.

In order to remove the inner receptacle 11 for the purpose of cleaning, or for any purpose whatever, it merely becomes necessary to rotate the top 17 sufficiently to bring the vertical grooves 20, 20 into register with the inwardly extending projections 16, 16 upon the receptacle 15 whereupon the top may be withdrawn from the casing 15, and access had to the interior of the receptacle 15. To secure the bottle in position again it merely becomes necessary to reverse the operation above described.

It will be noted that by reason of our improved construction, we are enabled to provide a vacuum receptacle comprising an outer casing and an inner receptacle so arranged relatively to each other that when the outer receptacle 15 is grasped in one hand, and the top 17 in the other hand, and the latter rotated in order to disengage the same from said outer receptacle 15, the inner receptacle or bottle 11 cannot be projected out of its receptacle 15 owing to the fact that the top 17 can be maintained in engagement with the upper end of the inner receptacle 11 until the parts have been fully separated, and thus prevent the bottle being suddenly projected from the receptacle 15 and broken by falling upon the floor, or striking any object in its path.

Having thus described our invention what we claim and desire to secure by Letters Patent, is:

A receptacle of the character described comprising a cylindrical outer casing closed at its bottom, a series of inwardly extending projections arranged adjacent to the upper end of said casing, a double-walled vessel arranged within said outer casing and having a reduced neck portion and a central depending member at its base, a cup conformed to the bottom of said double-walled vessel having a central aperture therein to receive said depending member, a coiled spring secured at one end to the under side of said cup and its other end bearing against the closed bottom of said casing for yieldingly supporting the same within said casing, a yielding packing disposed upon the upper end of said double-walled receptacle and surrounding the reduced neck portion thereof, and a top for said outer casing having an annular shoulder thereon, an annular recess below said shoulder, and a series of vertical recesses having their upper ends communicating with said annular recess and their lower ends extending to the lower edge of said top, said recesses being adapted to receive any of the projections arranged upon the upper end of said casing and permit of said annular recess being interlocked therewith to secure said parts together, and said double-walled vessel in position within said casing, substantially as specified.

Signed at the city of New York, in the county and State of New York, this 9th day of February, nineteen hundred and eleven.

FRED H. DECKER.
LOUIS J. STILLING.

Witnesses:
CONRAD A. DIETERICH,
JOSEPH G. QUINN, Jr.

Copies of this patent may be obtained for five cents each, by addressing the "Commissioner of Patents, Washington, D. C."